US012558937B2

(12) United States Patent
Tomiyama et al.

(10) Patent No.: US 12,558,937 B2
(45) Date of Patent: Feb. 24, 2026

(54) ATTACHMENT FOR VEHICLE INTERIOR MATERIAL

(71) Applicants: SHIGERU CO., LTD., Ota (JP);
SUBARU CORPORATION, Tokyo (JP)

(72) Inventors: Minoru Tomiyama, Ota (JP); Hiroshi Nakamura, Tokyo (JP)

(73) Assignees: Shigeru Co., Ltd, Ota (JP); Subaru Corporation, Tokyo (JP)

( * ) Notice: Subject to any disclaimer, the term of this patent is extended or adjusted under 35 U.S.C. 154(b) by 533 days.

(21) Appl. No.: 17/974,021

(22) Filed: Oct. 26, 2022

(65) Prior Publication Data

US 2023/0133306 A1 May 4, 2023

(30) Foreign Application Priority Data

Nov. 2, 2021 (JP) ................................ 2021-1793277

(51) Int. Cl.
*B60H 1/00* (2006.01)
*B60K 35/10* (2024.01)
*B60K 35/50* (2024.01)

(52) U.S. Cl.
CPC ........... *B60H 1/0075* (2013.01); *B60K 35/10* (2024.01); *B60K 35/50* (2024.01)

(58) Field of Classification Search
CPC ... F16B 21/086; F16B 21/125; B60R 13/0206
USPC ................ 24/289, 453, 455; 411/21; 454/75
See application file for complete search history.

(56) References Cited

U.S. PATENT DOCUMENTS

| | | |
|---|---|---|
| 2010/0162534 A1 | 7/2010 | Kato |
| 2019/0032696 A1 | 1/2019 | Sbongk |
| 2020/0032829 A1* | 1/2020 | Lee ........................ F16B 21/086 |

FOREIGN PATENT DOCUMENTS

| | | |
|---|---|---|
| JP | 11986145056 U | 9/1986 |
| JP | 2003-023168 A | 1/2003 |
| WO | 2009008185 A1 | 1/2009 |

OTHER PUBLICATIONS

Suga, Kazuyuki, Notice of Reasons for Refusal (Patent Application 2021-179327), Feb. 18, 2025, Japan.

* cited by examiner

*Primary Examiner* — Vivek K Shirsat
(74) *Attorney, Agent, or Firm* — Jodi A. Reynolds, Esq.; Harter Secrest & Emery LLP

(57) ABSTRACT

An attachment includes an abutment plate portion and a retaining portion. The abutment plate portion cannot be inserted into a mounting hole. The abutment plate portion includes an insertion hole in a middle portion thereof. The retaining portion is disposed on a back side of the abutment plate portion. The attachment is mounted on the mounting hole by the retaining portion inserted into the mounting hole, the abutment plate portion abutted against a peripheral edge portion of the mounting hole from a front side and a lock portion of the retaining portion engaged with the peripheral edge portion of the mounting hole from a back side. A body portion of a solar radiation sensor is inserted into the insertion hole, a head portion of the solar radiation sensor is abutted against the abutment plate portion and at least one catch claw of the body portion of the solar radiation sensor is engaged with the lock portion of the retaining portion.

8 Claims, 10 Drawing Sheets

ATTACHMENT FOR VEHICLE INTERIOR MATERIAL

CROSS-REFERENCE TO RELATED APPLICATIONS

The present application claims priority from Japanese Patent Application No. 2021-179327 filed on Nov. 2, 2021, the entire contents of which are hereby incorporated by reference.

BACKGROUND

The technology relates to an attachment to be mounted on a mounting hole formed in a vehicle interior material for attaching components to the mounting hole.

Various electrical components are mounted on a vehicle interior material of an automobile. A solar radiation sensor, as an example of the electrical components, may be mounted on a top face of an instrument panel, as an example of the interior material, disposed in a front portion of a vehicle interior.

Japanese Unexamined Patent Application Publication No. 2003-23168 discloses a structure for mounting a solar radiation sensor on an instrument panel.

The solar radiation sensor includes a flange portion and a body portion. A catch claw formed of a spring elastically displaceable in a radial direction of the body portion is disposed in the body portion. The body portion of the solar radiation sensor is inserted into a mounting hole formed in the instrument panel, the flange portion of the solar radiation sensor is abutted against a peripheral edge portion of the mounting hole from a front side and the catch claw of the body portion is engaged with the peripheral edge portion of the mounting hole from a back side, and thereby the solar radiation sensor is mounted on the instrument panel.

SUMMARY

One embodiment of the technology provides an attachment for a vehicle interior material. The attachment includes an abutment plate portion, a first retaining portion and a second retaining portion. The attachment is mounted on a mounting hole for attaching a component to the mounting hole formed in the vehicle interior material. The component includes a body portion and a head portion protruded from the body portion in a flange configuration. The body portion has a catch claw disposed therein. The catch claw is elastically displaceable in a radial direction of the body portion. The abutment plate portion has dimensions that do not permit the abutment plate portion to be inserted into the mounting hole of the vehicle interior material. The abutment plate portion has an insertion hole formed in a middle portion thereof. The first retaining portion and the second retaining portion are disposed on a back side of the abutment plate portion. The first retaining portion and the second retaining portion are insertable into the mounting hole of the vehicle interior material. The first retaining portion and the second retaining portion are inserted into the mounting hole of the vehicle interior material, the abutment plate portion is abutted against a peripheral edge portion of the mounting hole in the vehicle interior material from a front side and the first retaining portion is engaged with the peripheral edge portion of the mounting hole from a back side, and thereby the attachment is mounted on the mounting hole. The insertion hole of the abutment plate portion is formed with dimensions that permit the body portion of the component to be inserted thereinto and that do not permit the head portion of the component to be inserted therein. The body portion of the component is inserted into the insertion hole, the head portion of the component is abutted against the abutment plate portion and the catch claw of the body portion of the component is engaged with the second retaining portion, and thereby the component is attached to the attachment.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
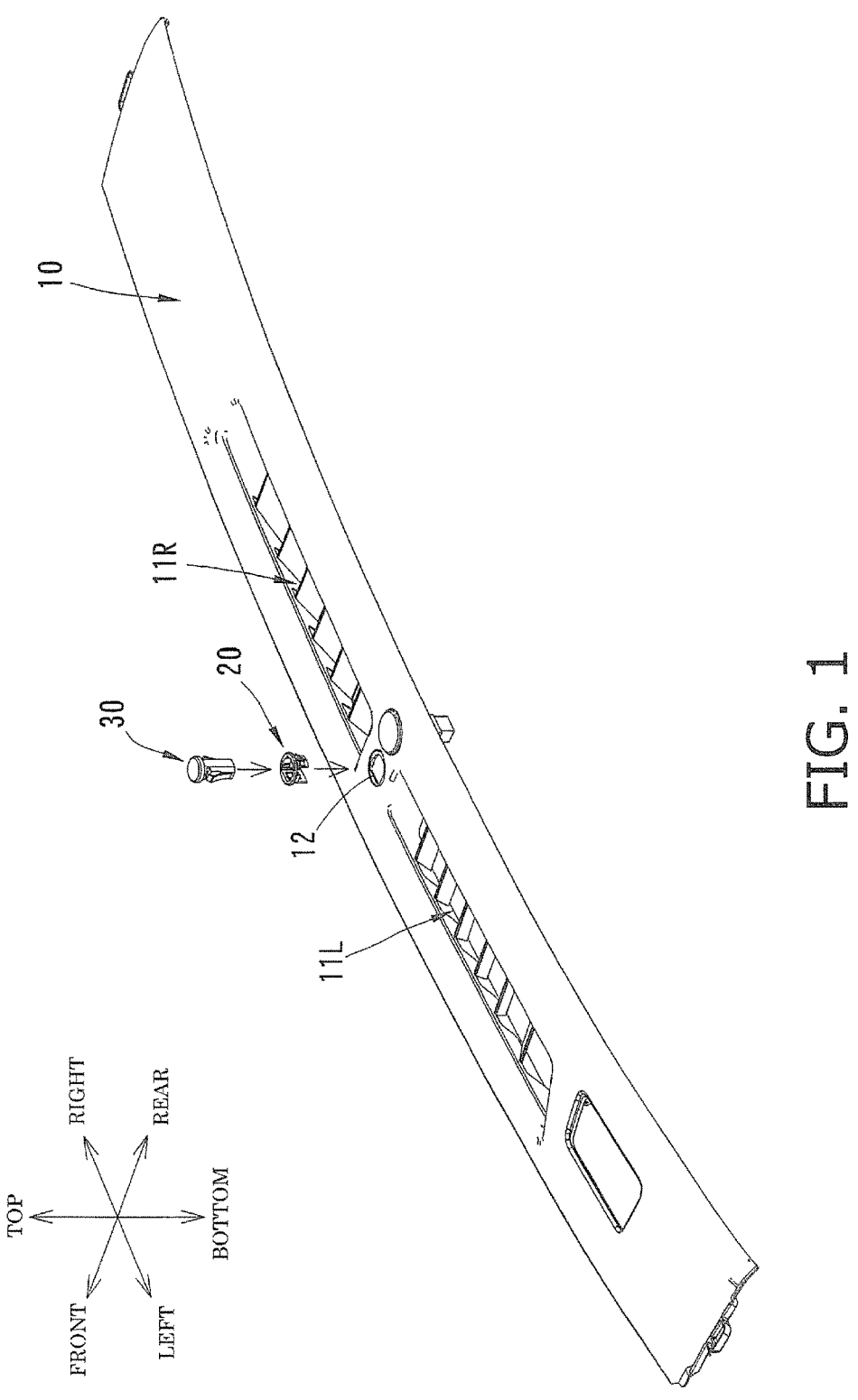
FIG. 1 is a perspective view, showing an attachment according to one embodiment of the technology, a defroster grille on which the attachment is mounted and a solar radiation sensor to be attached to the attachment.

In the structure for mounting the solar radiation sensor on the instrument panel disclosed in Japanese Unexamined Patent Application Publication No. 2003-23168, the mounting hole of the instrument panel is formed according to a shape of the solar radiation sensor. Therefore, when a solar radiation sensor having a different shape is to be mounted thereto due to a specification change, it is required to provide a new instrument panel having a mounting hole having a shape corresponding to a shape of the solar radiation sensor. Further, it is also required to make anew a mold for the instrument panel. In view of the foregoing, it is desired to provide an attachment for a vehicle that solves the problem mentioned above.

In the following, some example embodiments of the technology are described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same reference numerals to avoid any redundant description.

An attachment for a vehicle interior material according to one embodiment of the technology will be described hereinafter with reference to the drawings. In this embodiment, the technology is applied to an attachment 20 which is to be mounted on a front defroster grille 10 (vehicle interior material) in a vehicle interior of an automobile and to which a solar radiation sensor 30 (component) is to be attached. The technology enables the solar radiation sensor 30 that cannot be directly attached to the front defroster grille 10 to be attached to the front defroster grille 10.

Figure 2:
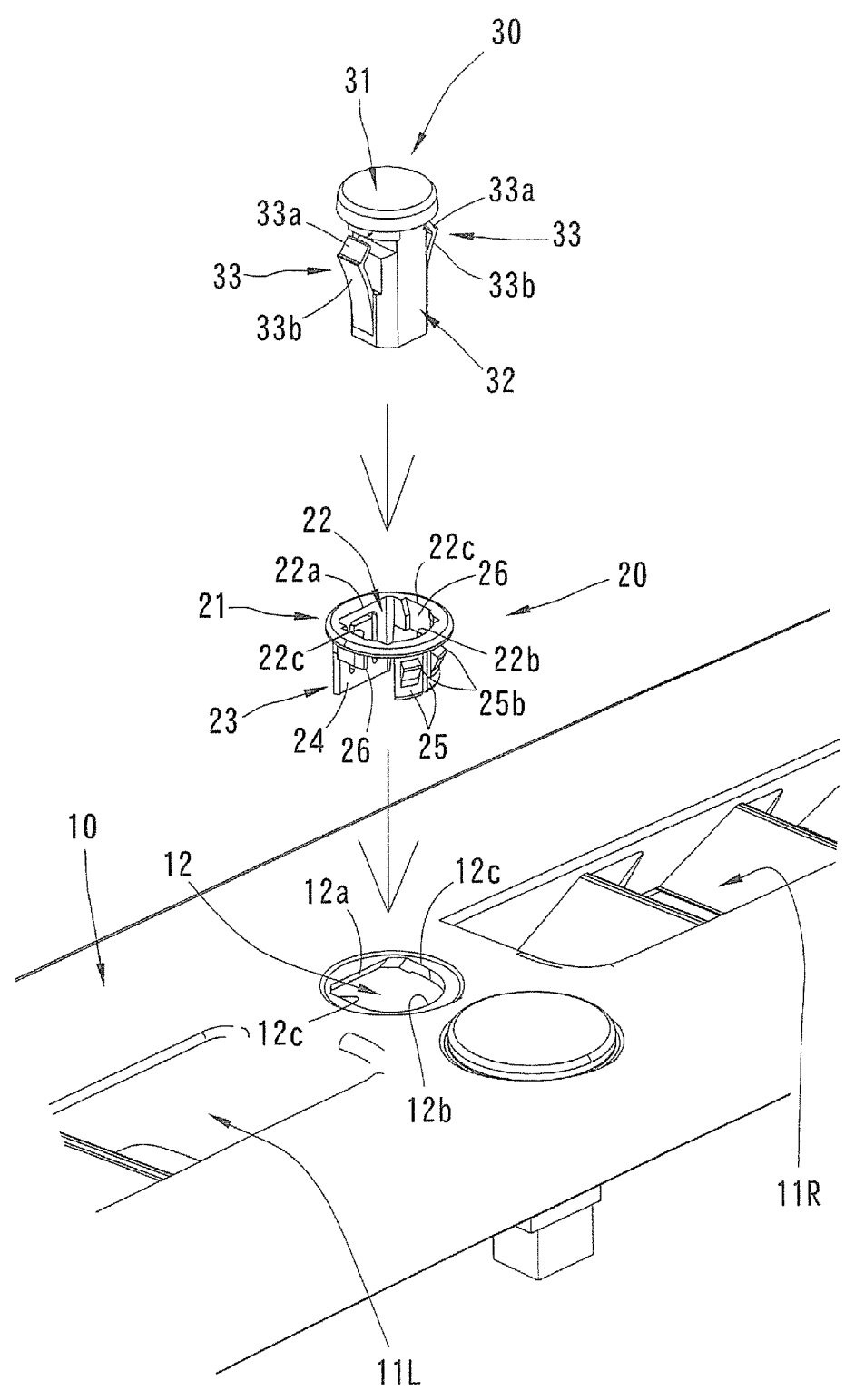
FIG. 2 is an enlarged view of a main portion of FIG. 1.
Figure 3:
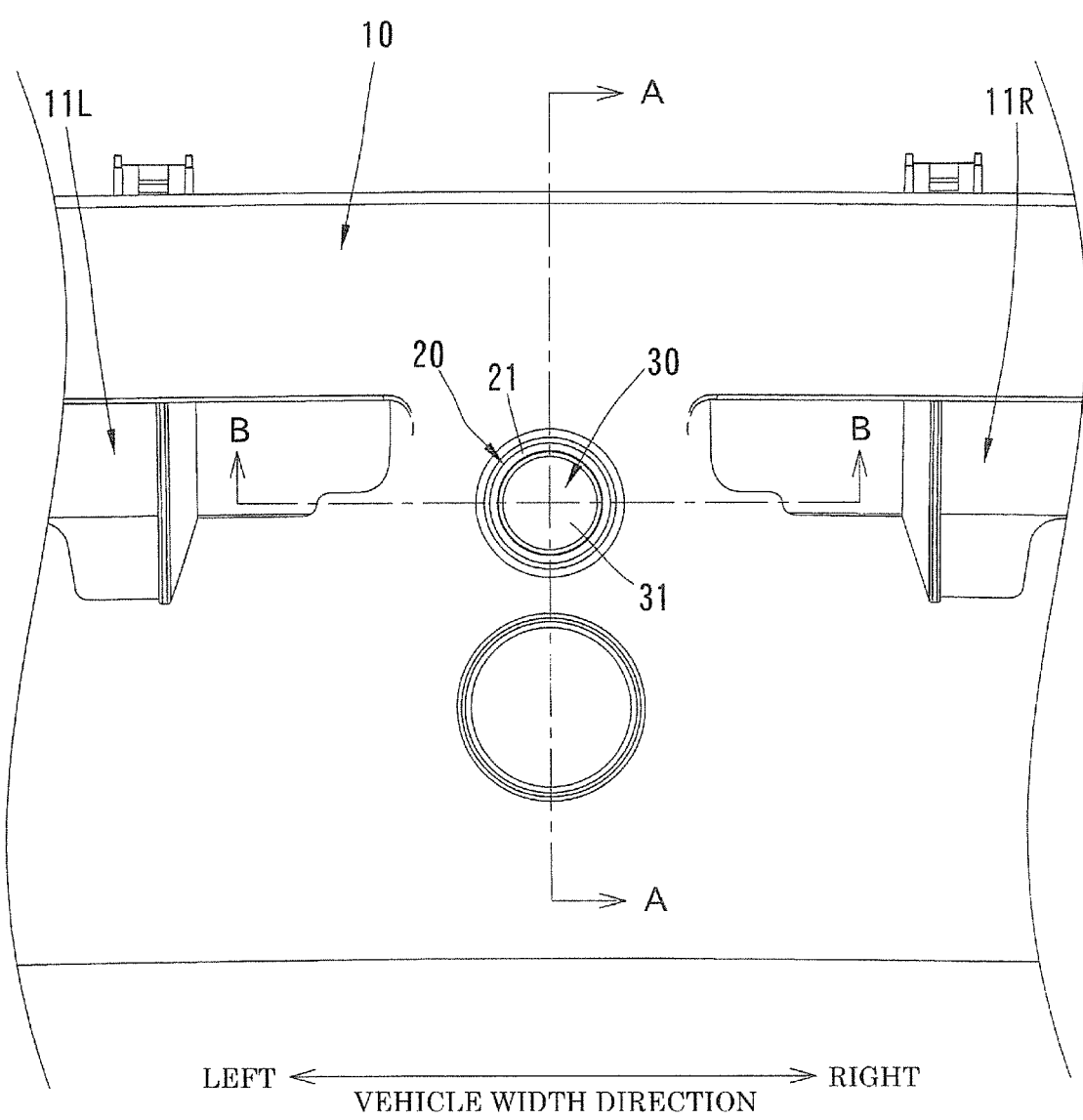
FIG. 3 is a plan view of the attachment mounted on the defroster grille, showing the attachment in a state in which the solar radiation sensor is attached thereto.

The front defroster grille 10 shown in FIGS. 1 and 2 is mounted on an instrument panel (not shown) disposed in a front portion of a vehicle interior of an automobile. The front defroster grille 10 is mounted in a middle portion of a front end edge portion of the instrument panel in a vehicle width direction. The front defroster grille 10 is made of resin and is formed in an elongated configuration elongated in the vehicle width direction by injection molding. The front defroster grille 10 is disposed along a lower edge of a front window (not shown). The front defroster grille 10 includes a pair of blow outlets 11L, 11R respectively disposed in left and right portions thereof. The blow outlets 11L, 11R blow out an air from an air conditioning device to the front window.

The front defroster grille 10 has a mounting hole 12 for mounting a component thereon formed between the two blow outlets 11L, 11R. Among components to be mounted on the mounting hole 12 are a solar radiation sensor 30 shown in FIGS. 1 to 5B and a solar radiation sensor 40 shown in FIGS. 7A and 7B. The solar radiation sensors 30, 40 sense intensity (brilliance) of the sun and output the sensed intensity as electrical signals. The electrical signals are used for automatic lighting control of a headlight, control of the air conditioning device and the like.

The mounting hole 12 is formed in a shape that fits a shape of one solar radiation sensor 40 (FIGS. 7A and 7B) of the two solar radiation sensors 30, 40. Accordingly, the solar radiation sensor 40 can be directly mounted on the mounting hole 12. However, the solar radiation sensor 30 (FIGS. 1 to 5B) having a different shape from that of the solar radiation sensor 40 cannot be directly mounted on the mounting hole 12. It is via an attachment 20 that the solar radiation sensor 30 is mounted on the mounting hole 12.

<Arrangements for Directly Mounting Solar Radiation Sensor>

Firstly, arrangements for directly mounting the solar radiation sensor 40 on the mounting hole 12 will be described with reference to FIGS. 7A and 7B.

The solar radiation sensor 40 includes a head portion 41 and a body portion 42. The head portion 41 is formed in a flattened disk configuration and has dimensions that do not permit the head portion 41 to be inserted into the mounting hole 12. An outer peripheral portion of the head portion 41 is protruded from the body portion 42 in a flange configuration.

The body portion 42 is disposed on a back face of the head portion 41. An external shape of a basal end portion (on the head portion 41 side) of the body portion 42 has a D-shaped cross-sectional configuration. The basal end portion of the body portion 42 includes a flat portion 42a, a protruded portion 42b protruded in an arched configuration and side face portions 42c, 42c connecting the flat portion 42a and the protruded portion 42b.

The mounting hole 12 having the shape that fits the solar radiation sensor 40 extends through the front defroster grille 10 in a thickness direction of the front defroster grille 10. As shown in FIG. 7A, the mounting hole 12 is formed to correspond to the D-shaped cross-sectional configuration of the body portion 42 of the solar radiation sensor 40. The mounting hole 12 includes a straight portion 12a, a curved portion 12b having an arched configuration and disposed opposed to the straight portion 12a and side portions 12c, 12c connecting end portions of the straight portion 12a and the curved portion 12b.

Catch claws 43, 43 are respectively disposed in the side face portions 42c, 42c that constitute a peripheral wall of the body portion 42 of the solar radiation sensor 40. Each of the catch claws 43 includes inclined faces 43a, 43b respectively on the head portion 41 side and on a distal end side of the body portion 42.

The inclined face 43a of the catch claw 43 is inclined further outward in a radial direction of the body portion 42 as it is distanced from the head portion 41 in an axial direction. The inclined face 43b is inclined further inward in the radial direction of the body portion 42 as it is distanced from the head portion 41 in the axial direction. The catch claw 43 is elastically displaceable inward in the radial direction of the body portion 42.

<Method for Directly Mounting the Solar Radiation Sensor>

A method for mounting the solar radiation sensor 40 on the mounting hole 12 will be described hereinafter.

Figure 7A:
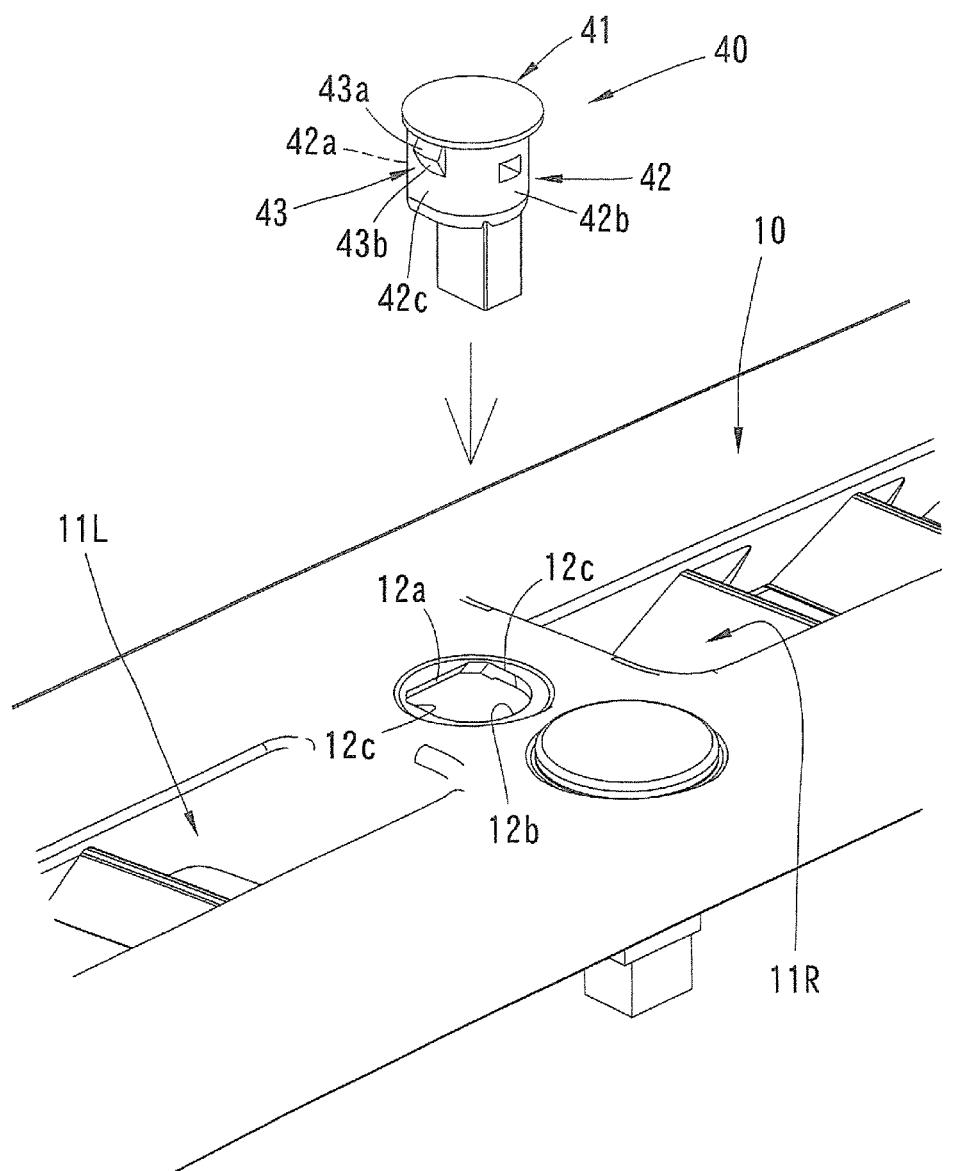
FIG. 7A is a perspective view, showing the defroster grille and a solar radiation sensor to be directly attached to a mounting hole of the defroster grille.

As shown in FIG. 7A, in order to align the mounting hole 12 and the body portion 42 of the solar radiation sensor 40 above the front defroster grille 10, the flat portion 42a, the protruded portion 42b and the side face portions 42c, 42c of the body portion 42 are respectively brought to positions corresponding to positions of the straight portion 12a, the curved portion 12b and the side portions 12c, 12c of the mounting hole 12. At this time, the catch claws 43, 43 of the body portion 42 are in a natural state in which no external force works thereon. The catch claws 43, 43 are protruded outward in the radial direction with respect to the side portions 12c, 12c of the mounting hole 12.

Figure 7B:
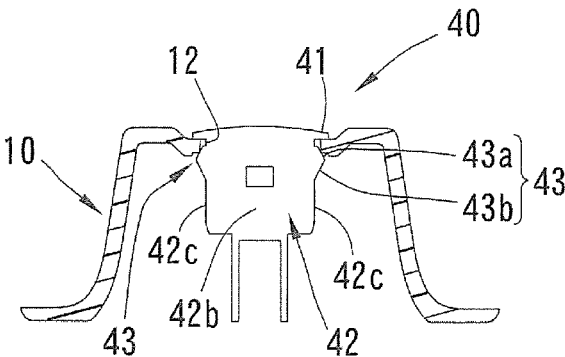
FIG. 7B is a cross-sectional view, showing the solar radiation sensor directly attached to the mounting hole of the defroster grille.

As shown in FIG. 7B, the body portion 42 is inserted into the mounting hole 12. When the catch claws 43, 43 ride over the mounting hole 12, the head portion 41 is abutted against the front defroster grille 10 at a peripheral edge portion of the mounting hole 12 from a front side and the inclined face 43a of the catch claw 43 is engaged with the front defroster grille 10 from a back side. Thereby, the solar radiation sensor 40 is directly mounted on the mounting hole 12.

<Arrangements for Mounting the Solar Radiation Sensor Via an Attachment>

Secondly, arrangements for mounting the solar radiation sensor 30 having a shape that does not fit the mounting hole 12 on the mounting hole 12 will be described hereinafter with reference to FIGS. 1 to 6.

When a component to be mounted on the mounting hole 12 is changed from the solar radiation sensor 40 shown in FIGS. 7A and 7B to the solar radiation sensor 30 shown in FIG. 2 due to a specification change, the solar radiation sensor 30 cannot be directly mounted on the mounting hole 12 because the shape of the solar radiation sensor 30 is different from the shape of the solar radiation sensor 40 and external dimensions of the solar radiation sensor 30 are smaller than external dimensions of the solar radiation sensor 40.

To prepare a new front defroster grille including a mounting hole having a shape that fits the solar radiation sensor 30 (FIG. 2), it is required to make a mold for the new front defroster grille. To avoid this inconvenience, the technology provides arrangements for mounting the solar radiation sensor 30 on the mounting hole 12 by mounting the attachment 20 on the mounting hole 12 for the solar radiation sensor 40 (FIGS. 7A and 7B) and mounting the solar radiation sensor 30 on the attachment 20.

As shown in FIG. 2, the solar radiation sensor 30 includes a head portion 31 having a disc configuration and a body portion 32 as with the solar radiation sensor 40 described above. An outer peripheral portion of the head portion 31 is protruded from the body portion 32 in a flange configuration. A distal end portion of the body portion 32 (on a side opposite to the head portion 31) has an external shape having an octagonal cross-sectional configuration. Catch claws 33, 33 are respectively disposed in a cantilever manner in a pair of opposite side faces of the distal end portion of the body portion 32.

Each of the catch claws 33 includes an inclined face 33a and an inclined face 33b. The inclined face 33b continues from the body portion 32 and is inclined further outward in a radial direction of the body portion 32 as it extends toward the head portion 31 in an axial direction of the body portion 32. The inclined face 33a continues from a distal end of the inclined face 33b and is inclined further inward in the radial direction of the body portion 32 as it extends toward the head portion 31 in the axial direction of the body portion 32.

The inclined face 33b of the catch claw 33 is inclined more gently than the inclined face 33a. The catch claw 33 is elastically displaceable in the radial direction of the body portion 32.

Figure 6:
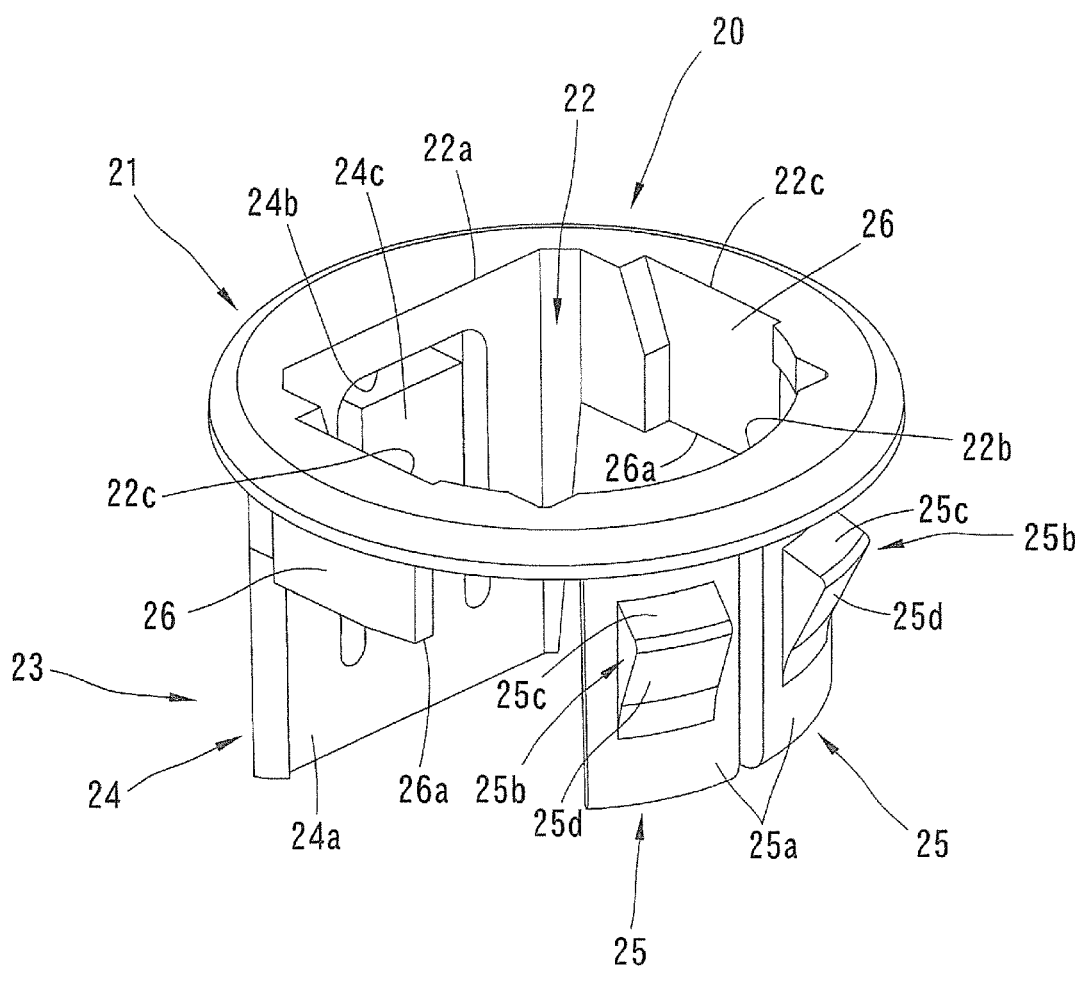
FIG. 6 is an enlarged perspective view of the attachment.

As shown in FIGS. 2 and 6, the attachment 20 includes an abutment plate portion 21 having a disc configuration and a retaining portion 23 disposed on a back side of the abutment plate portion 21.

The abutment plate portion 21 has dimensions that do not permit the abutment plate portion 21 to be inserted into the mounting hole 12 of the front defroster grille 10. An insertion hole 22 is formed in a middle portion of the abutment plate portion 21. The insertion hole 22 extends through the abutment plate portion 21 in a thickness direction thereof.

The insertion hole 22 is formed in a D-shaped configuration. The insertion hole 22 includes a straight portion 22a, a curved portion 22b opposed to the straight portion 22a and side portions 22c, 22c connecting end portions of the straight portion 22a and the curved portion 22b. The body portion 32 of the solar radiation sensor 30 can be inserted into the insertion hole 22. However, the head portion 31 cannot be inserted into the insertion hole 22.

The retaining portion 23 is disposed along a peripheral edge portion of the insertion hole 22. The retaining portion 23 includes a lock portion 24 (first retaining portion), two lock portions 25 (first retaining portion) and two lock portions 26 (second retaining portion).

The lock portion 24 is disposed at a location along the straight portion 22a of the insertion hole 22. The two lock portions 25 are disposed at locations along the curved portion 22b of the insertion hole 22. The lock portions 26, 26 are respectively disposed at locations along the side portions 22c, 22c.

The retaining portion 23 (lock portions 24, 25, 26) can be inserted into the mounting hole 12 of the front defroster grille 10.

The lock portions 24, 25, 25 (first retaining portions) prohibit the attachment 20 mounted on the mounting hole 12 from escaping therefrom. Since a plurality of the first retaining portions are provided, an effect of prohibiting the attachment 20 from escaping from the mounting hole 12 may be enhanced.

The lock portions 26, 26 (second retaining portions) prohibit the solar radiation sensor 30 attached to the attachment 20 from escaping therefrom. Since a plurality of the second retaining portions are provided, an effect of prohibiting the solar radiation sensor 30 from escaping from the attachment 20 may be enhanced.

Each of the lock portions 24, 25, 26 will be described in detail hereinafter.

As shown in FIG. 6, the lock portion 24 includes a plate-like piece portion 24a extending in an axial direction of the insertion hole 22 from a portion along the straight portion 22a in the abutment plate portion 21. A slit 24b having a C-shaped configuration convex toward the abutment plate portion 21 is formed in the plate-like piece portion 24a.

A portion surrounded by the slit 24b is a displaceable portion 24c. The displaceable portion 24c has a cantilever configuration. A distal end portion (upper end portion) of the displaceable portion 24c is a free end portion. The free end portion is displaceable in such a manner as to be elastically rotatable about a basal end portion of the displaceable portion 24c.

Figure 4A:
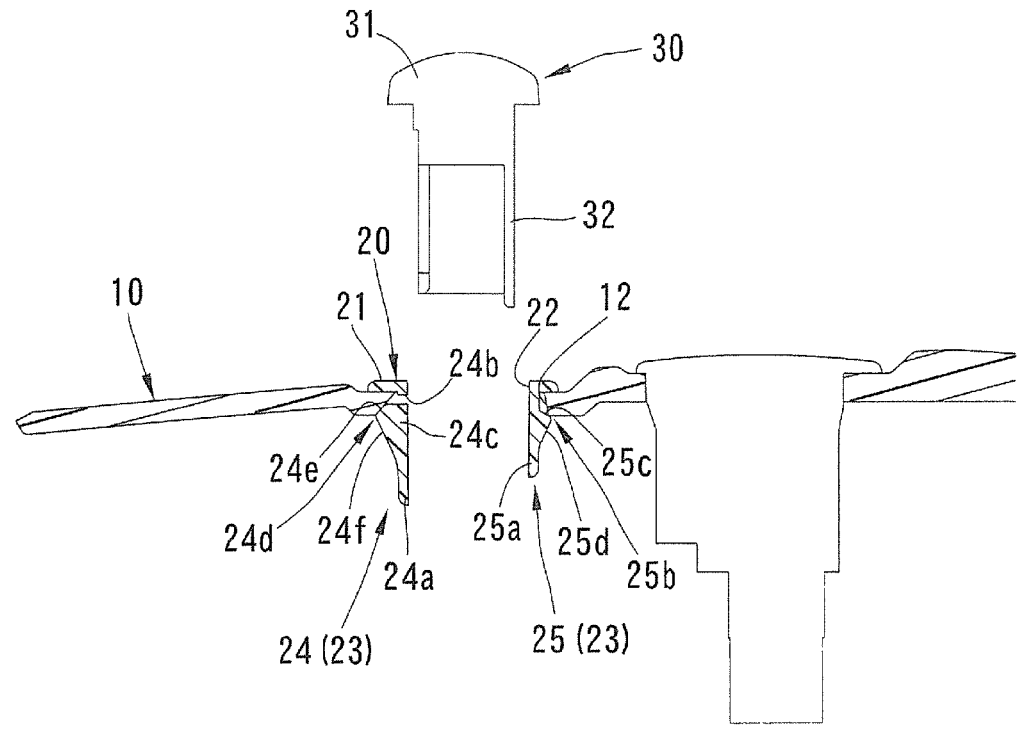
FIG. 4A is an enlarged cross-sectional view taken along line A-A of FIG. 3, showing the attachment in a state before the solar radiation sensor is attached thereto.

As shown in FIG. 4A, a protruded portion 24d is disposed in an outer face of the free end portion of the displaceable portion 24c. The protruded portion 24d includes inclined faces 24e, 24f respectively on the abutment plate portion 21 side and a distal end side of the plate-like piece portion 24a.

The inclined face 24e is inclined further outward in a radial direction as it is distanced from the abutment plate portion 21 in the axial direction of the insertion hole 22. The inclined face 24f is inclined further inward in the radial direction as it is distanced from the abutment plate portion 21 in the axial direction of the insertion hole 22. The inclined face 24f is inclined more gently than the inclined face 24e.

As shown in FIG. 6, each of the lock portions 25 includes a plate-like piece portion 25a extending in the axial direction of the insertion hole 22 from a portion along the curved portion 22b in the abutment plate portion 21. The plate-like piece portion 25a has a cantilever configuration. A distal end portion (lower end portion) of the plate-like piece portion 25a is a free end portion. The free end portion is displaceable in such a manner as to be elastically rotatable about a basal end portion of the plate-like piece portion 25a.

A protruded portion 25b is disposed in an outer face of each of the plate-like piece portions 25a. As shown in FIGS. 4A and 6, the protruded portion 25b includes inclined faces 25c, 25d respectively on the abutment plate portion 21 side and a distal end side of the plate-like piece portion 25a.

The inclined face 25c is inclined further outward in the radial direction as it is distanced from the abutment plate portion 21 in the axial direction of the insertion hole 22. The inclined face 25d is inclined further inward in the radial direction as it is distanced from the abutment plate portion 21 in the axial direction of the insertion hole 22. The inclined face 25d is inclined more gently than the inclined face 25c.

Figure 4B:
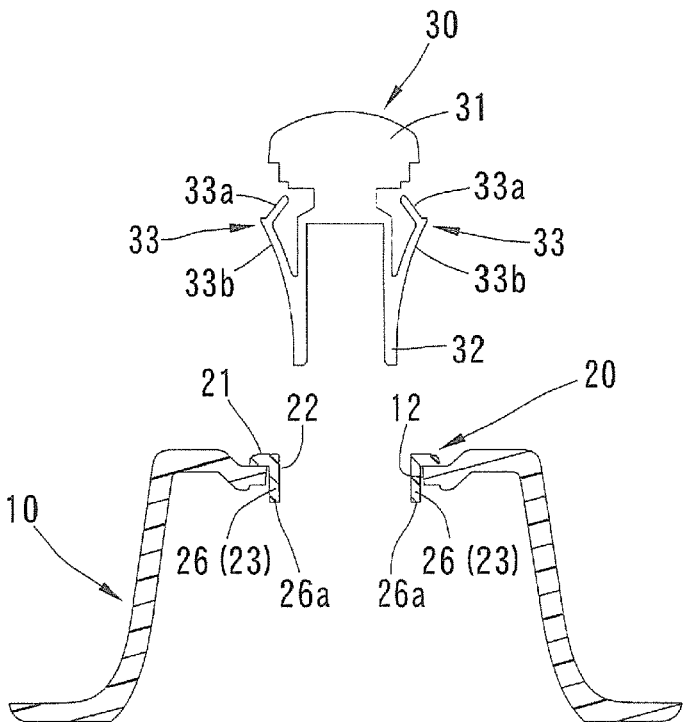
FIG. 4B is an enlarged cross-sectional view taken along line B-B of FIG. 3, showing the attachment in a state before the solar radiation sensor is attached thereto.

As shown in FIGS. 4B and 6, each of the lock portions 26 is formed as a plate-like piece extending in the axial direction of the insertion hole 22 from a portion along the side portion 22c in the abutment plate portion 21. A distal end of the lock portion 26 includes an engagement face 26a facing downward and having a perpendicularly cut-out configuration with respect to an extending direction thereof. The catch claw 33 of the solar radiation sensor 30 is engaged with the engagement face 26a as will be described later. That is, the solar radiation sensor 30 is engaged in a simplified arrangement.

<Method for Mounting the Solar Radiation Sensor Via the Attachment>

A method for mounting the attachment 20 having the features mentioned above on the mounting hole 12 will be described hereinafter.

As shown in FIG. 2, the mounting hole 12 and the retaining portion 23 of the attachment 20 are aligned above the front defroster grille 10. Specifically, the lock portion 24 of the attachment 20 is brought to a position corresponding to a position of the straight portion 12a of the mounting hole 12. The lock portions 25, 25 are brought to positions corresponding to a position of the curved portion 12b. The lock portions 26, 26 are respectively brought to positions corresponding to positions of the side portions 12c, 12c.

At this time, the lock portion 24 and the lock portion 25 are in a natural state in which no external force works thereon. The protruded portion 24d of the lock portion 24 is protruded outward in the radial direction with respect to the straight portion 12a of the mounting hole 12. The protruded portion 25b of the lock portion 25 is protruded outward in the radial direction with respect to the curved portion 12b of the mounting hole 12.

When the retaining portion 23 of the attachment 20 is inserted into the mounting hole 12 as shown in FIGS. 4A and 4B, the protruded portion 24d of the lock portion 24 rides over the straight portion 12a of the mounting hole 12 and the protruded portion 25b of the lock portion 25 rides over the curved portion 12b of the mounting hole 12 as shown in FIG. 4A.

At this time, the abutment plate portion 21 is abutted against the front defroster grille 10 at the peripheral edge portion of the mounting hole 12 from the front side and the inclined face 24e of the lock portion 24 and the inclined face 25c of the lock portion 25 are engaged with the front defroster grille 10 from the back side. Thereby, the attachment 20 is mounted on the mounting hole 12.

Since the inclined faces 24f, 25d of the lock portions 24, 25 located farther from the abutment plate portion 21 are inclined gently, the inclined faces 24f, 25d can ride over the mounting hole 12 easily. Since the inclined faces 24e, 25c of the lock portions 24, 25 located closer to the abutment plate portion 21 are inclined steeply, the inclined faces 24e, 25c cannot ride over the mounting hole 12 easily. Accordingly, the attachment 20 may be easily mounted on the mounting hole 12 and cannot be easily removed from the mounting hole 12.

Particularly, since the inclined faces 24f, 25d are inclined gently and the displaceable portion 24c including the inclined face 24f and the plate-like piece portion 25a including the inclined face 25d are elastically displaceable, workability of mounting of the attachment 20 on the front defroster grille 10 is improved.

Next, a method for mounting the solar radiation sensor 30 on the attachment 20 mounted on the mounting hole 12 will be described hereinafter.

As shown in FIG. 2, the insertion hole 22 of the attachment 20 and the body portion 32 of the solar radiation sensor 30 are aligned. Specifically, the catch claws 33, 33 of the body portion 32 are brought to positions respectively corresponding to positions of the side portions 22c, 22c of the insertion hole 22.

At this time, the catch claws 33, 33 of the body portion 32 of the solar radiation sensor 30 are in a natural state in which no external force works thereon. The catch claws 33, 33 are protruded outward in the radial direction with respect to the side portions 22c, 22c of the insertion hole 22.

Figure 5A:
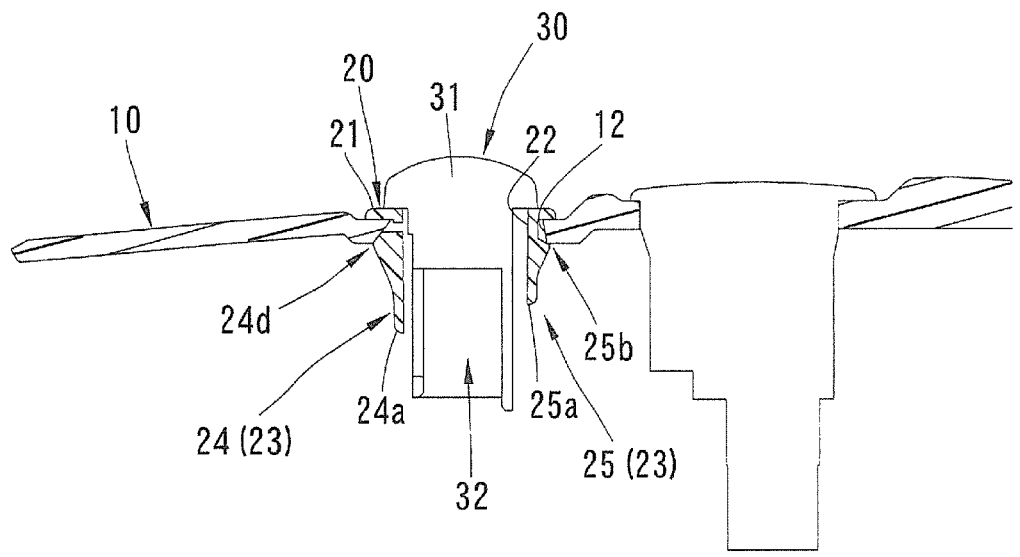
FIG. 5A is an enlarged cross-sectional view taken along line A-A of FIG. 3.
Figure 5B:
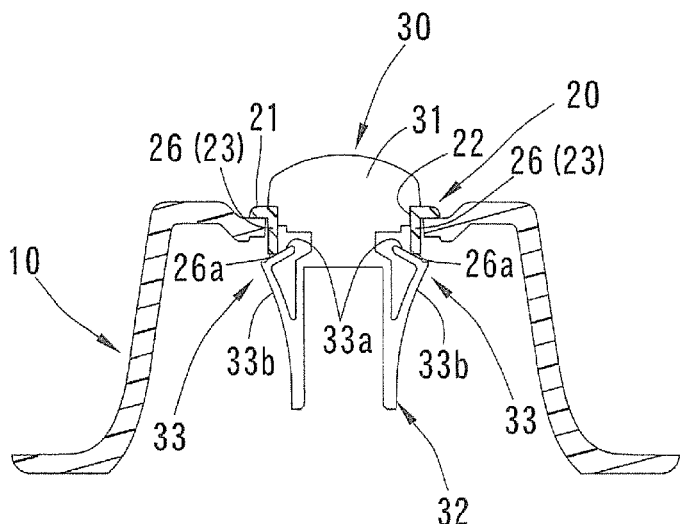
FIG. 5B is an enlarged cross-sectional view taken along line B-B of FIG. 3.

When the body portion 32 of the solar radiation sensor 30 is inserted into the insertion hole 22 as shown in FIGS. 5A and 5B, each of the catch claws 33 rides over the side portion 22c of the insertion hole 22 and the lock portion 26 as shown in FIG. 5B.

At this time, the head portion 31 of the solar radiation sensor 30 is abutted against a portion of the abutment plate portion 21 constituting the peripheral edge portion of the insertion hole 22 from the front side. The inclined face 33a of the catch claw 33 of the solar radiation sensor 30 is engaged with the engagement face 26a of the lock portion 26. Thereby, the solar radiation sensor 30 is attached to the attachment 20, and further, to the mounting hole 12 of the front defroster grille 10 as show in FIGS. 3, 5A and 5B.

The inclined face 33b of the catch claw 33 inclined gently can ride over the insertion hole 22 and the lock portion 26 easily. On the other hand, the inclined face 33a cannot ride over the lock portion 26 easily because the inclined face 33a is inclined steeply and the engagement face 26a of the attachment 20 to be engaged with the inclined face 33a is oriented to an insertion direction of the solar radiation sensor 30. Accordingly, the solar radiation sensor 30 may be easily attached to the insertion hole 22 of the attachment 20 and cannot be easily removed from the insertion hole 22.

<Effects of the Attachment>

The attachment 20 described above enables the solar radiation sensor 30 having a shape that does not fit the mounting hole 12 of the front defroster grille 10 to be mounted on the front defroster grille 10. Thereby, it is not required to prepare, for every solar radiation sensor having a different shape, a new front defroster grille including a mounting hole that fits the solar radiation sensor. Further, it is not required to make a new mold for injection molding the new front defroster grille. That is, a front defroster grille can be shared by solar radiation sensors having different shapes.

The technology is not limited to the embodiment described above and various modifications may be adopted without departing from the spirit or scope of the technology.

The vehicle interior material is not limited to the front defroster grille. The vehicle interior material may be various vehicle interior materials including an instrument panel, a door trim, a roof trim, a roof side trim, a pillar trim and the like.

Components to be mounted on the vehicle interior material are not limited to the solar radiation sensor. The components may be various components including other electrical components and the like.

The technology can be applied to an attachment to be mounted on a mounting hole formed in a vehicle interior material for mounting components on the mounting hole.

According to at least one embodiment of the technology, the technology enables a component having a shape that does not fit a mounting hole to be mounted on a vehicle interior material and makes the vehicle interior material to be sharable.

Although some example embodiments and modification examples of the technology are described hereinabove, the foregoing embodiments and modification examples are mere examples and are not intended to limit the scope of the technology. It should be also appreciated that various omissions, replacements, and modifications may be made in the foregoing embodiments and modification examples described herein, without departing from the scope of the technology. The technology is intended to include such modifications and alterations in so far as they fall within the scope of the appended claims or the equivalents thereof.

The invention claimed is:

1. An attachment for a vehicle interior material to be mounted on a mounting hole for attaching a first component to the mounting hole formed in the vehicle interior material, the first component including a body portion and a head portion protruded from the body portion in a flange configuration, the body portion having at least one catch claw disposed therein, the at least one catch claw elastically displaceable in a radial direction of the body portion, the attachment for the vehicle interior material comprising:

an abutment plate portion having dimensions that do not permit the abutment plate portion to be inserted into the mounting hole of the vehicle interior material, the abutment plate portion including an insertion hole formed in a middle portion thereof;

at least one first retaining portion disposed on a back side of the abutment plate portion, the at least one first retaining portion insertable into the mounting hole of the vehicle interior material; and at least one second retaining portion disposed on the back side of the abutment plate portion, the at least one second retaining portion insertable into the mounting hole of the vehicle interior material, wherein a second component that has larger dimensions than the first component includes a body portion and a head portion protruded from the body portion in a flange configuration, the body portion having at least one catch claw disposed therein, the at least one catch claw elastically displaceable in a radial direction of the body portion, the second component can be attached to the mounting hole in the vehicle interior material by engaging the catch claw with a peripheral edge portion of the mounting hole, wherein the at least one first retaining portion and the at least one second retaining portion are inserted into the mounting hole with the second retaining portion aligned with a position at which the catch claw of the second component is engaged with the peripheral edge portion of the mounting hole, the abutment plate portion is abutted against the peripheral edge portion of the mounting hole in the vehicle interior material from a front side and the at least one first retaining portion is engaged with the peripheral edge portion of the mounting hole from the back side, and thereby the attachment is mounted on the mounting hole, wherein the insertion hole of the abutment plate portion is formed with dimensions that permit the body portion of the first component to be inserted thereinto and that do not permit the head portion of the first component to be inserted therein, and wherein the body portion of the first component is inserted into the insertion hole, the head portion of the first component is abutted against the abutment plate portion and the at least one catch claw of the body portion of the first component is engaged with the at least one second retaining portion, and thereby the first component is attached to the attachment.

2. The attachment for the vehicle interior material according to claim 1, wherein the at least one first retaining portion and the at least one second retaining portion respectively comprise a plurality of first retaining portions and a plurality of second retaining portions and wherein the plurality of first retaining portions and the plurality of second retaining portions are disposed along a peripheral edge portion of the insertion hole.

3. The attachment for the vehicle interior material according to claim 1, wherein a displaceable portion is disposed in the at least one first retaining portion, the displaceable portion is formed in a cantilever manner extending in an axial direction of the insertion hole, a distal end portion of the displaceable portion is elastically displaceable in a radial direction and a protruded portion protruded outward in the radial direction is disposed on an outside of the displaceable portion, and wherein when the at least one first retaining portion is inserted into the mounting hole of the vehicle interior material, the protruded portion rides over the mounting hole by elastic deformation of the displaceable portion and the protruded portion is engaged with a back side of the vehicle interior material.

4. The attachment for the vehicle interior material according to claim 2, wherein displaceable portions are respectively disposed in the plurality of first retaining portions, the displaceable portions are formed in a cantilever manner extending in an axial direction of the insertion hole, distal end portions of the displaceable portions are elastically displaceable in a radial direction and protruded portions protruded outward in the radial direction are respectively disposed on outsides of the displaceable portions, and wherein when the plurality of first retaining portions are inserted into the mounting hole of the vehicle interior material, the protruded portions ride over the mounting hole by elastic deformation of the displaceable portions and the protruded portions are engaged with a back side of the vehicle interior material.

5. The attachment for the vehicle interior material according to claim 1, wherein the at least one second retaining portion is formed as a plate-like piece portion extending in an axial direction and the at least one catch claw of the first component is engaged with a distal end of the plate-like piece portion.

6. The attachment for the vehicle interior material according to claim 2, wherein the plurality of second retaining portions are formed as plate-like piece portions extending in an axial direction and catch claws of the first component are respectively engaged with distal ends of the plate-like piece portions.

7. The attachment for the vehicle interior material according to claim 3, wherein the at least one second retaining portion is formed as a plate-like piece portion extending in an axial direction and the at least one catch claw of the first component is engaged with a distal end of the plate-like piece portion.

8. The attachment for the vehicle interior material according to claim 4, wherein the plurality of second retaining portions are formed as plate-like piece portions extending in an axial direction and catch claws of the first component are respectively engaged with distal ends of the plate-like piece portions.

* * * * *